(12) United States Patent
Oh

(10) Patent No.: US 10,920,832 B2
(45) Date of Patent: Feb. 16, 2021

(54) AIR VENT SYSTEM FOR CONSTANT VELOCITY JOINTS

(71) Applicant: DANA AUTOMOTIVE SYSTEMS GROUP, LLC, Maumee, OH (US)

(72) Inventor: Seung Tark Oh, Ann Arbor, MI (US)

(73) Assignee: Dana Automotive Systems, Group, LLC, Maumee, OH (US)

( * ) Notice: Subject to any disclaimer, the term of this patent is extended or adjusted under 35 U.S.C. 154(b) by 328 days.

(21) Appl. No.: 15/775,076

(22) PCT Filed: Nov. 8, 2016

(86) PCT No.: PCT/US2016/060928
§ 371 (c)(1),
(2) Date: May 10, 2018

(87) PCT Pub. No.: WO2017/083269
PCT Pub. Date: May 18, 2017

(65) Prior Publication Data
US 2018/0347638 A1 Dec. 6, 2018

Related U.S. Application Data

(60) Provisional application No. 62/253,941, filed on Nov. 11, 2015.

(51) Int. Cl.
*F16D 3/84* (2006.01)
*F16D 3/223* (2011.01)

(52) U.S. Cl.
CPC .............. *F16D 3/845* (2013.01); *F16D 3/223* (2013.01); *F16D 3/843* (2013.01);
(Continued)

(58) Field of Classification Search
CPC .......... F16D 3/845; F16D 3/843; F16D 3/223; F16D 2003/2232; F16D 2003/846;
(Continued)

(56) References Cited

U.S. PATENT DOCUMENTS 2,769,457 A * 11/1956 Wittenberg ............. A47J 27/09
137/854
6,318,533 B1  11/2001 Krisher
(Continued)

FOREIGN PATENT DOCUMENTS

JP  2002310179  10/2002
WO  2008085525  7/2008
(Continued)

OTHER PUBLICATIONS

European Patent Office, International Search Report with Written Opinion issued in PCT/US2016/060928, dated Feb. 24, 2017, 11 pages, European Patent Office, Rijswijk, Netherlands.

*Primary Examiner* — Greg Binda
(74) *Attorney, Agent, or Firm* — Marshall & Melhorn, LLC

(57) ABSTRACT

An air venting system for a constant velocity joint (20) having an inner race (24), an outer race (22), a cage (26), a plurality of torque transferring elements (28), a drive sleeve, a drive nut and a boot assembly. The outer race has a wall portion (90) having a vent hole (88, 242) with a first and a second axially extending channel (224, 264). A radially extending wall integrally connects the second axially extending channel to the first axially extending channel. A valve (256) having a stopper portion (264), a disk portion (258) and a breather portion (260) is at least partially located within the vent hole. The breather portion (260) further includes an axially extending ring (292) that terminates in a radially extending wall. At least a portion (300) of an edge portion of the radially extending wall of the breather portion of the valve is in direct contact with at least a portion (250) of an outer surface of the wall portion of the outer race.

15 Claims, 7 Drawing Sheets

(52) U.S. Cl.
CPC ............... *F16D 2003/2232* (2013.01); *F16D 2003/846* (2013.01); *Y10S 277/928* (2013.01); *Y10S 464/906* (2013.01); *Y10T 137/789* (2015.04); *Y10T 137/9138* (2015.04); *Y10T 464/10* (2015.01)

(58) Field of Classification Search
CPC .. F16D 3/84; Y10T 137/789; Y10T 137/9138; Y10T 464/10; Y10S 277/928; Y10S 464/906; F16H 57/04; F16K 7/17
USPC ............... 464/17; 137/799, 854; 277/928
See application file for complete search history.

(56) References Cited

U.S. PATENT DOCUMENTS

| | | | |
|---|---|---|---|
| 6,530,843 B2 | 3/2003 | Miller | |
| 6,540,616 B2 | 4/2003 | Miller | |
| 6,722,991 B2 * | 4/2004 | Chrobak | F16D 3/06 464/17 |
| 6,793,581 B2 | 9/2004 | Meyer | |
| 6,793,584 B2 | 9/2004 | Ramey | |
| 6,830,074 B2 | 12/2004 | Wang | |
| 6,988,949 B2 | 1/2006 | Wang | |
| 7,204,760 B2 | 4/2007 | Wang | |
| 7,377,854 B2 | 5/2008 | Wormsbaecher | |
| 7,534,172 B2 | 5/2009 | Wormsbaecher | |
| 8,157,657 B2 | 4/2012 | Lamothe | |
| 8,197,346 B2 | 6/2012 | Miller | |
| 8,641,538 B2 | 2/2014 | Oh | |
| 9,206,858 B2 | 12/2015 | Oh | |
| 9,284,990 B2 | 3/2016 | Oh | |
| 2005/0101390 A1 | 5/2005 | Wang | |
| 2005/0143180 A1 | 6/2005 | Johnson | |
| 2007/0173337 A1 | 7/2007 | Wormsbaecher | |
| 2012/0129616 A1 | 5/2012 | Disser | |
| 2016/0053818 A1 | 2/2016 | Oh | |

FOREIGN PATENT DOCUMENTS

| | | |
|---|---|---|
| WO | 2014066121 | 5/2014 |
| WO | 2015077679 | 5/2015 |
| WO | 2015095130 | 6/2015 |
| WO | 2015153431 | 10/2015 |

* cited by examiner

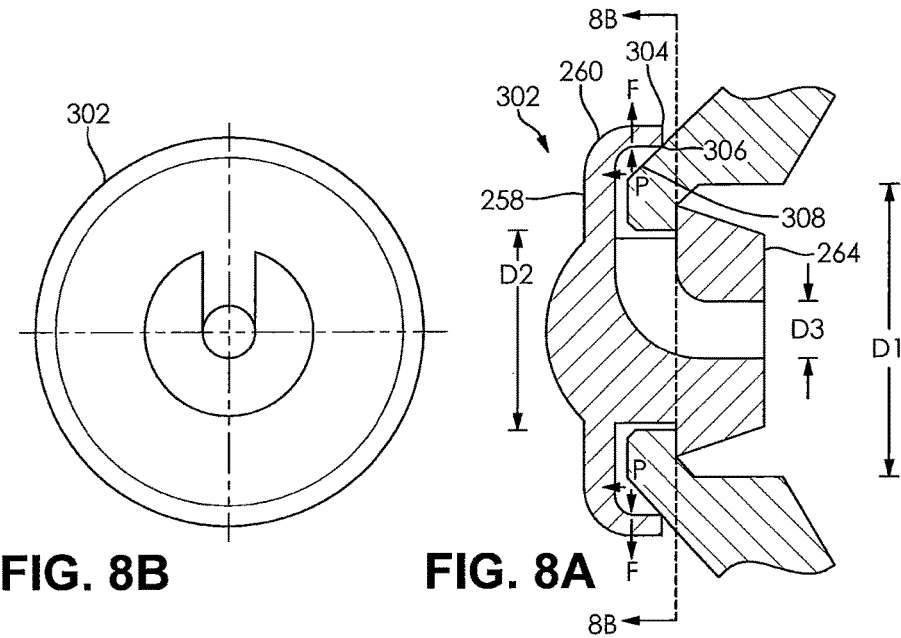
FIG. 8B  FIG. 8A
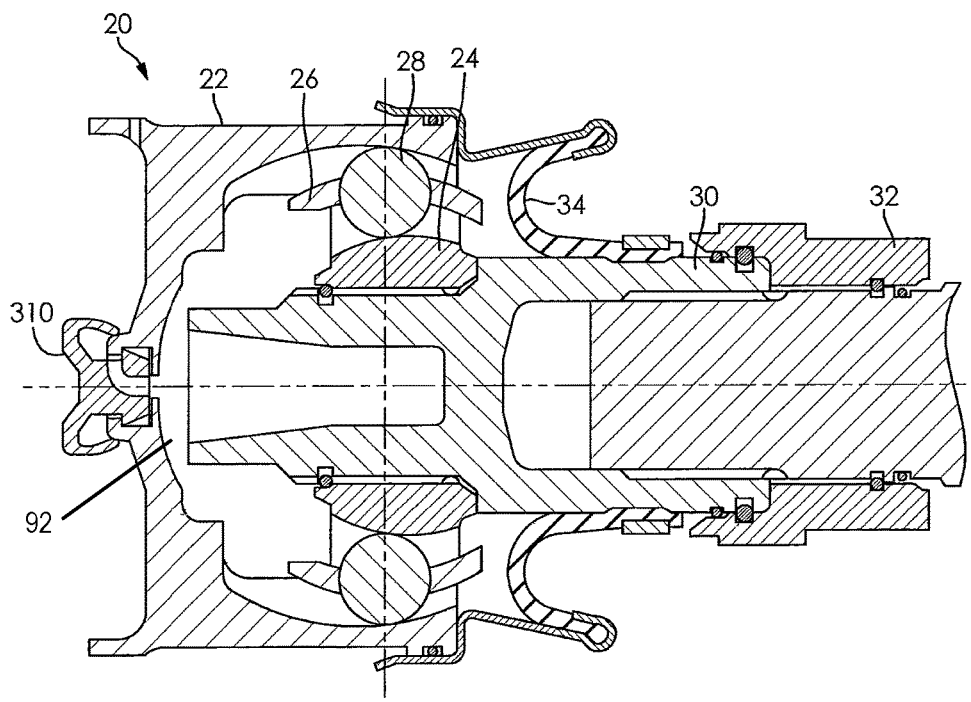
FIG. 9

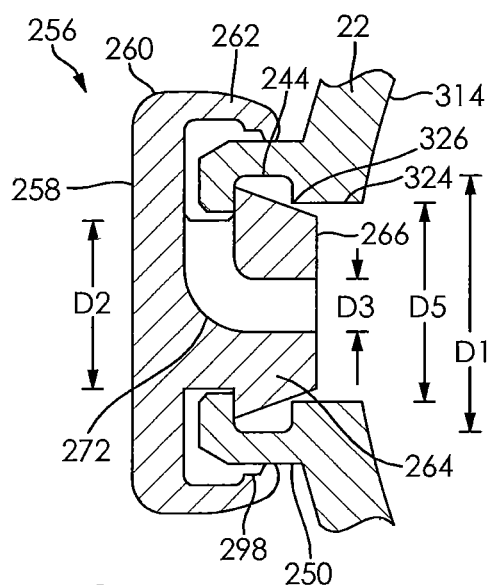
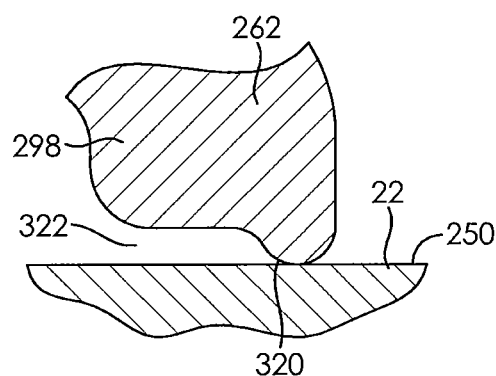
FIG. 13  FIG. 14
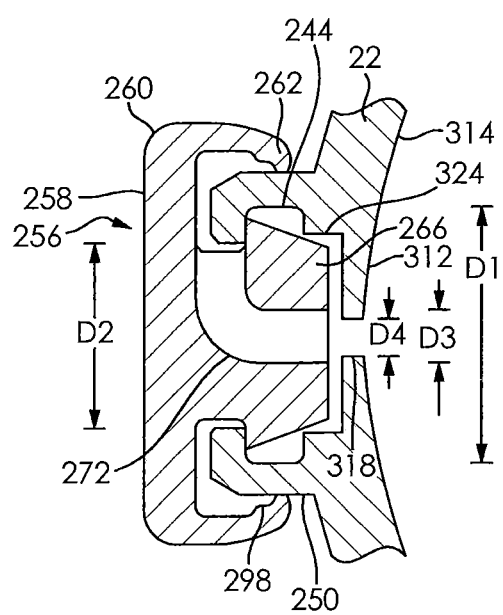
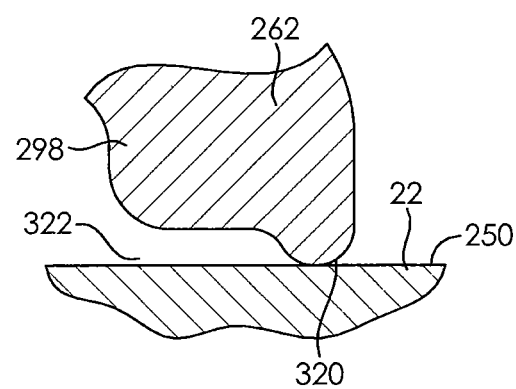
FIG. 15  FIG. 16

AIR VENT SYSTEM FOR CONSTANT VELOCITY JOINTS

CROSS REFERENCE TO RELATED APPLICATIONS

The present application is the National Stage of International Application No. PCT/2016/060928, filed Nov. 8, 2016, which claims the benefit to U.S. Provisional Patent Application No. 62/253,941 filed on Nov. 11, 2015, which are incorporated herein by reference in its entirety.

FIELD OF THE DISCLOSURE

The present disclosure relates to a constant velocity joint for use in a vehicle having an air vent system with a valve.

BACKGROUND OF THE DISCLOSURE

Vehicles having a drive train with one or more drive shafts or propeller shafts that operate at a variable angle typically employ the use of one or more constant velocity joint assemblies. The constant velocity joint assembly allows the one or more drive shafts or propeller shafts in the drive train to transmit the rotational energy generated by an engine of the vehicle through a variable angle at a constant rotational speed and without an appreciable increase in friction or play. Typical constant velocity joints include the use of a rubber boot assembly to seal the components of the constant velocity joint from exposure to the environment. Additionally, conventional constant velocity joints typically include the use of a grease or a lubricant to reduce the amount of wear and to reduce the amount of friction in the constant velocity joint system. Finally, conventional constant velocity joint assemblies further include the use of a flexible boot assembly that seals the components of the constant velocity joint assembly from the environment. The flexible boot assembly additionally aids in retaining the grease or lubricant within the constant velocity joint assembly.

As the constant velocity joint articulates and rotates in operation, the pressure within the constant velocity joint assembly increases. It is also well understood that the pressure within the constant velocity joint assembly will increase and decrease based on the conditions of the external environment the constant velocity joint assembly is in. As the pressure within the constant velocity joint assembly increases and decreases it exerts a force onto the boot of the constant velocity joint assembly thereby constantly changing the shape and geometry of the boot. Additionally, as the pressure within the constant velocity joint changes it causes what is referred to as boot-to-boot contact. Boot-to-boot contact is when portions of the boot that typically do not come into contact with one and another do come into contact with one and another. Finally, as the pressure within the constant velocity joint changes it causes what is referred to as a boot inversion. A boot inversion is when the portions of the boot that should not be axially blown outward are axially blown outward. All of this results in an undesirable reduction of the life and the durability of the constant velocity boot. It would therefore be advantageous to develop a way to vent the pressure within the constant velocity joint assembly and increase the life and durability of the boot of the constant velocity assembly.

In order to alleviate the pressure within the constant velocity joint assembly, conventional constant velocity joint assemblies also include the use of a vent hole. The vent hole allows the constant velocity joint to vent off the excess pressure within the assembly thereby reducing the amount of force exerted on the boot. A common problem with these systems is that the constant velocity joint assembly may leak some of the grease or the lubrication fluid contained within the constant velocity joint assembly through the vent hole. Leakage of the grease or lubrication fluid typically occurs when the constant velocity joint assembly is in a static position not in operation and the assembly is articulated to an angle θ such that the vent hole falls below the grease or lubrication fluid fill line. Once the vent hole falls below the grease or lubrication fluid line, the grease or lubrication fluid begins to leak out of the constant velocity joint assembly. This can result in a reduction in the life of the constant velocity joint assembly. It would therefore also be advantageous to develop a constant velocity joint venting system that will vent the excess pressure from within the assembly and will reduce and/or eliminate the leakage of the grease or lubrication fluid from the assembly when the assembly is in a static position.

To solve the problem of grease or lubricant fluid leakage out of the constant velocity joint assembly, many conventional constant velocity joint assemblies typically employ the use of a valve. The valve is typically made of a flexible material and is press-fitted into the vent hole of the constant velocity joint assembly. Once the pressure within the constant velocity joint assembly reaches a pre-determined pressure, a lip portion of the valve flexes allowing the excess pressure from within the assembly to be vented to the atmosphere. The venting of these conventional valve systems is solely dependent on the internal pressure of the constant velocity joint assembly whether or not the assembly is in a static or a dynamic condition. The problem with conventional valve systems is that if the design of the valve is such that the valve will not flex until the internal pressure of the assembly is at a relatively high pressure, it will still exert an undesirable amount of force onto the boot and/or it will cause undesirable boot-to-boot contact and/or boot inversion which will result in a reduction of the life and durability of the boot. In contrast, if the valve is designed to flex at too low of a pressure, the valve will open too easily which can result in unwanted grease or lubrication fluid leakage from the constant velocity joint assembly. It would therefore be advantageous to develop a constant velocity joint venting system that will be allow the valve to open at a lower pressure when in a dynamic condition versus when in a static condition.

SUMMARY OF THE DISCLOSURE

An air venting system for a constant velocity join having an inner race, an outer race, a plurality of torque transferring elements, a drive sleeve, a drive nut and a boot assembly. The outer race of the constant velocity joint has a wall portion. The wall portion of the outer race of the constant velocity joint has a vent hole having a first axially extending channel and a second axially extending channel. A radially extending wall integrally connects the second axially extending channel to the first axially extending channel on the wall portion of the outer race. The first axially extending channel has a diameter D1 that is larger than the diameter D2 of the second axially extending channel on the wall portion of the outer race.

A valve having a stopper portion, a disk portion and a breather portion is at least partially located within the vent hole in the wall portion of the outer race of the constant velocity joint. The stopper portion of the valve includes a first axial inner portion, a second axial outer portion and a radially outward extending portion that is disposed between the first axial inner portion and the second axial outer portion of the valve. The first axial inner portion is at least partially located within the first axially extending channel in the wall portion of the outer race of the constant velocity joint. Additionally, the second axial outer portion of the stopper portion of the valve is located within the second axially extending channel in the wall portion of the outer race.

Disposed axially adjacent to the second axial outer portion of the stopper portion of the valve is the disk portion having an inner surface and an outer surface. The disk portion of the valve extends radially outward from the second axial outer portion of the stopper portion of the valve.

The breather portion of the valve has an axially extending ring that terminates in radially extending wall. At least a portion of an edge portion of the radially extending wall of the breather portion of the valve is in direct contact with at least a portion of an outer surface of the wall portion of the outer race.

BRIEF DESCRIPTION OF THE FIGURES

The above, as well as other advantages of the present disclosure, will become readily apparent to those skilled in the art from the following detailed description when considered in light of the accompanying drawings in which:

FIG. 8A is a partial schematic cross-sectional side-view of the constant velocity joint illustrated in FIGS. 1-5A and 7 where the constant velocity joint assembly has an outer race with a vent hole according to an embodiment of the disclosure and the valve illustrated in FIG. 7;

FIG. 8B is a schematic bottom-view of the valve according to the embodiment of the disclosure illustrated in FIGS. 7 and 8A;

FIG. 9 is a schematic cross-sectional side-view of the constant velocity joint assembly illustrated in FIGS. 1-5A, 7 and 8A where the constant velocity joint assembly has an outer race with a vent hole according to an alternative embodiment of the disclosure and the valve illustrated in FIGS. 4, 5A and 5B;

FIG. 13 is a partial schematic cross-sectional side-view of the constant velocity joint illustrated in FIGS. 1-5A, 7, 8A and 9-12 where the constant velocity joint assembly has an outer race with a vent hole and a valve according to still yet another embodiment of the disclosure;

FIG. 14 is a partial schematic cross-sectional side-view of the valve and outer race interface according to the embodiment of the disclosure illustrated in FIG. 13;

FIG. 15 is a partial schematic cross-sectional side-view of the constant velocity joint illustrated in FIGS. 1-5A, 7, 8A and 9-14 where the constant velocity joint assembly has an outer race with a vent hole according to a further embodiment of the disclosure and the valve illustrated in FIGS. 13 and 14; and FIG. 16 is a partial schematic cross-sectional side-view of the valve and outer race interface according to the embodiment of the disclosure illustrated in FIG. 15.

DETAILED DESCRIPTION OF THE DISCLOSURE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless expressly stated otherwise.

A constant velocity joint assembly 20 will be described herein. The constant velocity joint assembly 20 will be described in connection with a vehicle (not depicted). However, it would be understood by one of ordinary skill in the art that the present disclosure could have industrial, locomotive, and aerospace applications.

The constant velocity joint assembly 20 may have applications to on-highway and off-highway vehicles. Further, the assembly 20 can be utilized with an all-wheel drive vehicle. Also, it should be appreciated that the assembly 20 could be utilized with a rear wheel drive vehicle or a front wheel drive vehicle.

Figure 1:
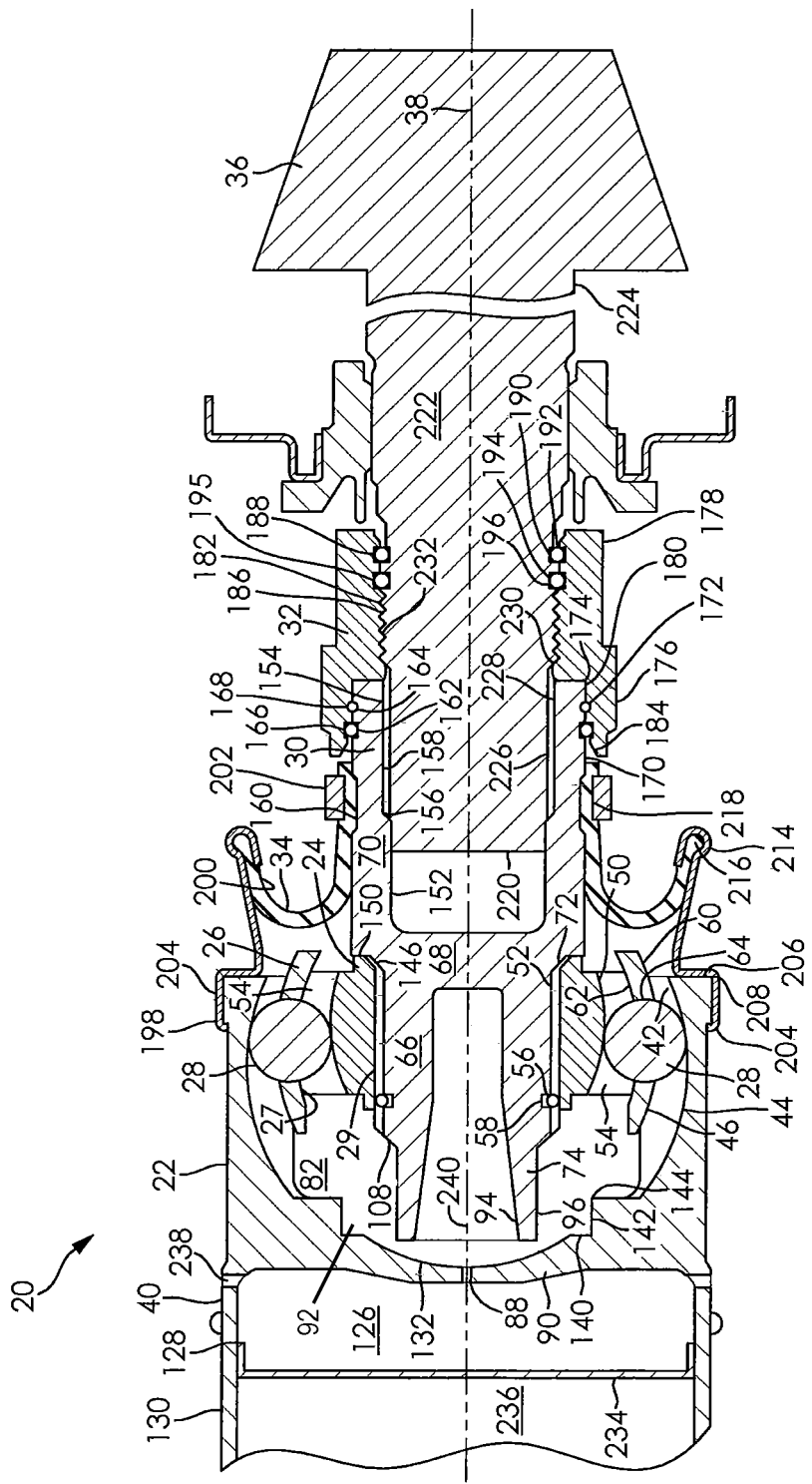
FIG. 1 is a schematic cross-sectional side-view of a constant velocity joint assembly according to an embodiment of the disclosure.

Referring now to the drawings, there is illustrated in FIG. 1 an embodiment of a constant velocity joint assembly 20 in accordance with the present disclosure. The constant velocity joint assembly 20 includes an outer race 22, an inner race 24, a cage 26, a plurality of torque transferring elements 28, a drive sleeve 30, a drive nut 32, and a boot assembly 34. A plug-in pinion shaft 36 is drivingly engaged with the drive sleeve 30, and the drive sleeve 30 is drivingly engaged with the inner race 24. Preferably, the outer race 22, inner race 24, drive sleeve 30, drive nut 32, boot assembly 34 and plug-in pinion shaft 36 are aligned with a longitudinal axis 38 of the assembly 20. The constant velocity joint assembly 20 may be of the Rzeppa variety. However, it should be understood that the constant velocity joint assembly may be any other type or variety of constant velocity joint.

The outer race 22 is a hollow cylindrical body formed from a rigid material, such as but not limited to iron, steel, aluminium or an alloy thereof. Typically, the outer race 22 is forged and then machined in a secondary operation. However, it is understood the outer race 22 may be formed using other processes from any rigid material. An attachment end 40 is formed in the outer race 22, and is drivingly engaged with a shaft (not shown). Alternately, it is understood that the attachment end 40 may be coupled to any other type of member.

A plurality of outer tracks 42 are formed in an inner surface 44 of the outer race 22. Each of the outer tracks 42 has an arcuate profile which follows an arcuate path, the arcuate path having a center point different from a center point of the constant velocity joint assembly 20. Preferably, the outer race 22 includes eight outer tracks 42 formed therein. However, it is understood that each of the outer tracks 42 may have a non-arcuate profile and any number of the outer tracks 42 may be formed in the outer race 22. The plurality of outer tracks 42 are equally spaced about the axis of the outer race 22.

The inner surface 44 of the outer race 22 is a spherical surface having a center point different from the center point of the constant velocity joint assembly 20. A radius of the inner surface 44 is complementary to an outer surface 46 of the cage 26. Typically, the plurality of outer tracks 42 and the inner surface 44 are precision machined for use as surfaces of a constant velocity joint assembly as is known in the art.

The inner race 24 is a hollow member formed from a rigid material such as but to limited to iron, steel, aluminium or an alloy thereof. It is understood that the inner race 24 may be formed using any conventional process from any rigid material. When the drive sleeve 30 is drivingly engaged with the inner race 24, the inner race 24 is typically splinedly disposed on an end portion of the drive sleeve 30.

The inner race 24 includes an inner race outer surface 27 and an inner race inner surface 29. The inner race outer surface 27 of the inner race 24 is a spherical surface having a center point common with the center point of the constant velocity joint assembly 20. The inner race inner surface 29 of the inner race 24 defines a substantially cylindrical bore through the inner race 24. A plurality of splines 52 are formed on the inner race inner surface 29 for drivingly engaging the inner race 24 with the drive sleeve 30.

A plurality of inner tracks 54 are formed in the inner race outer surface 27. Each of the inner tracks 54 has an arcuate profile which follows an arcuate path. The arcuate path of the inner tracks 54 have a center point that is different from a center point of the constant velocity joint assembly 20. Additionally, the diameter of the arcuate profile of each of the inner tracks 54 is complementary to the diameter of the arcuate profile of each of the outer tracks 42 corresponding thereto. As shown in FIG. 1, a depth of each of the inner tracks 54 varies depending on a distance the inner race outer surface 27 is from the axis of the inner race 24. Preferably, the inner race 24 includes eight inner tracks 54 formed therein. However, it is understood that each of the inner tracks 54 may have a non-arcuate profile and any number of the inner tracks 54 may be formed in the inner race 24. The plurality of inner tracks 54 are equally spaced about the axis of the inner race 24.

A snap ring 56 is used to secure the inner race 24 to the drive sleeve 30. The snap ring 56 is disposed in a groove 58 that is formed in an outer surface of the drive sleeve 30. Alternately, any other type of fastener may be used to secure the inner race 24 to the drive sleeve 30.

The cage 26 is a hollow body that is disposed between the outer race 22 and the inner race 24. In a non-limiting example, the cage 26 is machined from a rigid material such as iron, steel, aluminium or an alloy thereof. However, it is understood that the cage 26 may be formed using other processes and from any rigid material. Additionally, the cage 26 further includes a spherical outer surface 60 and a spherical inner surface 62. A plurality of perforations 64 is formed through the cage 26.

The spherical outer surface 60 has a center point common with the center point of the constant velocity joint assembly 20. The spherical outer surface 60 defines a portion of each of the perforations 64. Disposed against and slidingly engaged with the inner surface 44 of the outer surface 22 is the spherical outer surface 60 of the cage 26. A diameter of the spherical outer surface 60 is complementary to the inner surface 44 of the outer race 22. It is understood that the spherical outer surface 60 and the inner surface 44 may be precision machined for use as mating surfaces of a constant velocity joint as is known in the art.

The spherical inner surface 62 has a center point common with the center point of the constant velocity joint assembly 20. Additionally, the spherical inner surface 62 defines a portion of each of the perforations 64. Disposed against and slidingly engaged the inner race outer surface 27 is the spherical inner surface 62 of the cage 26. A radius of the spherical inner surface 62 is complementary to a radius of the inner race outer surface 27. It is understood that the spherical inner surface 62 and the inner race outer-surface 60 may be precision machined for use as mating surfaces of a constant velocity joint as is known in the art.

The plurality of torque transferring elements 28 comprises a plurality of spheres that are disposed in each of the perforations 64, the outer tracks 42, and the inner tracks 54 of the constant velocity joint assembly 20. As a non-limiting example, each of the torque transferring elements 28 is a ball bearing that is made of iron, steel, aluminium or an alloy thereof as is commonly known in the art. However, it is understood that the plurality of torque transferring elements 28 may be any other shape and formed from any other rigid material. A diameter of each of the torque transferring elements 28 is complementary to the diameter of the arcuate profiles of each of the outer tracks 42 and the inner tracks 54. The torque transferring elements 28, the outer tracks 42 and the inner tracks 54 are precision machined for use as mating surfaces of a constant velocity joint assembly as is known in the art. One torque transferring element of the plurality of the torque transferring elements 28 is disposed in and contacts one of the outer tracks 42 and one of the inner tracks 54. Additionally, the torque transferring element is also in sliding engagement with the outer track 42 and the inner track 54 it is disposed in.

Figure 2:
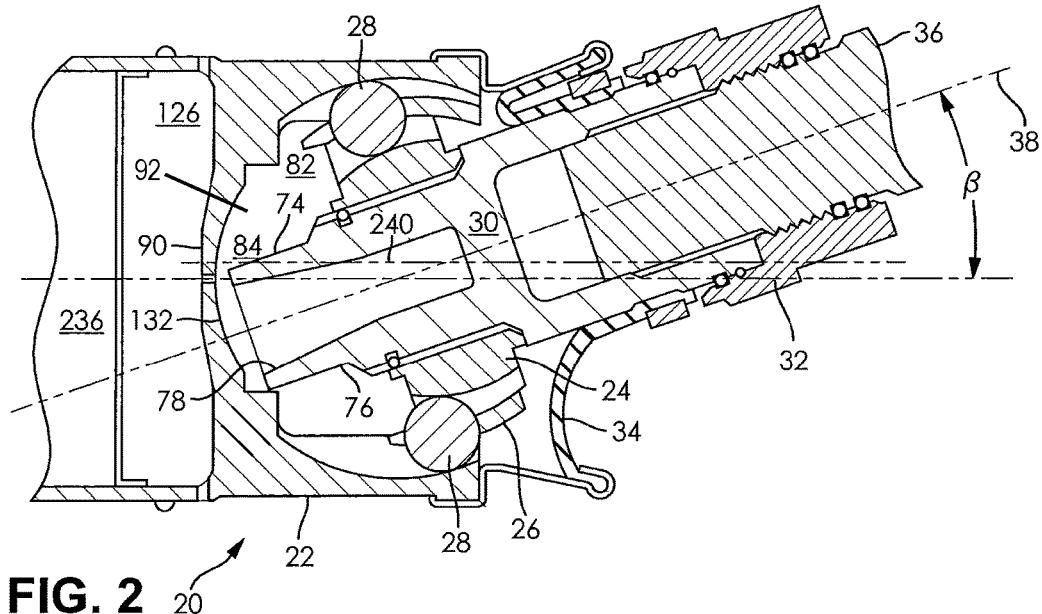
FIG. 2 is a schematic cross-sectional side-view of the constant velocity joint illustrated in FIG. 1 where the constant velocity joint assembly is in a static condition and at a maximum articulation angle β.
Figure 3:
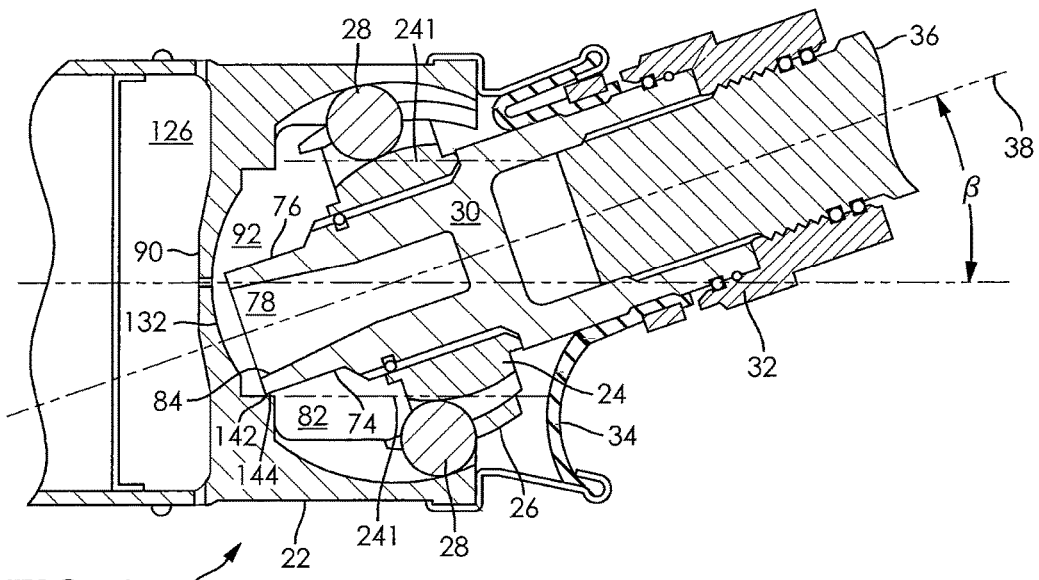
FIG. 3 is a schematic cross-sectional side-view of the constant velocity joint illustrated in FIGS. 1 and 2 where the constant velocity joint assembly is in a dynamic condition and at a maximum articulation angle β.

Disposed against and in driving engagement with the inner race 24 is the drive sleeve 30. As a non-limiting example, the drive sleeve 30 is an annular member formed from a rigid material such as iron, steel, aluminium or an alloy thereof. It is understood that the drive sleeve 30 may be formed using any conventional process from any rigid material. As illustrated in FIGS. 1-3, the drive sleeve 30 comprises a first end portion 66, a middle portion 68, and a second end portion 70. The first end portion 66 is drivingly engaged with the inner race 24, the middle portion 68 is disposed against the inner race 24, and the second end portion 70 is drivingly engaged with the plug-in pinion shaft 36.

The first end portion 66 is a generally cylindrically shaped portion of the drive sleeve 30 that is spliningly engaged with the inner race 24. A plurality of splines 72 are formed in an outer surface of the first end portion 66. Alternately, it is understood that the drive sleeve 30 may be unitarily formed with the inner race 24 or coupled thereto in any conventional manner. The groove 58 is formed in the first end portion 66 of the drive sleeve 30.

A stopper portion 74 is attached to the drive sleeve 30. More specifically, the stopper portion 74 is attached to the first end portion 66 of the drive sleeve 30. As non-limiting example, the stopper portion 74 is made of iron, an iron alloy, aluminium, an aluminium alloy, steel, a steel alloy, a plastic material, an elastomeric material, a rubber material and/or a carbon fibre material. It is understood that the stopper portion may be formed of other rigid materials.

Figure 4:
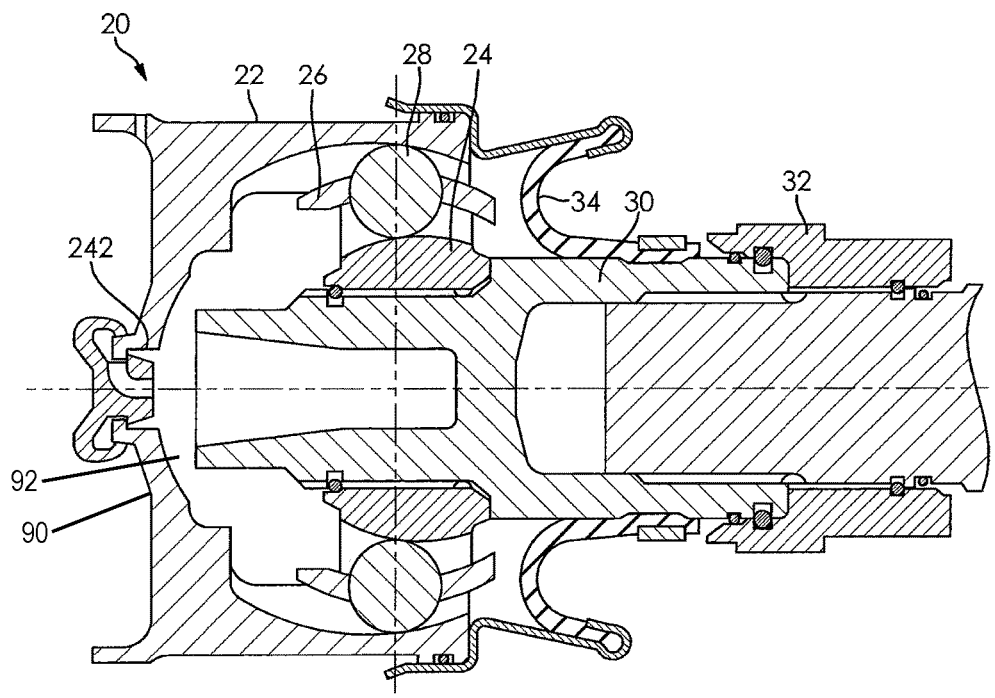
FIG. 4 is a schematic cross-sectional side-view of the constant velocity joint illustrated in FIGS. 1, 2 and 3 where the constant velocity joint assembly has an outer race with a vent hole and a valve according to an embodiment of the disclosure.

As illustrated in FIGS. 2-4, the stopper portion 74 is of a generally annular shape such that an outer portion 76 and an inner portion 78 define a cavity 84. The cavity 84 is in fluid communication with a first vent hole 88 provided through a wall portion 90 of the outer race 22. Additionally, the cavity 84 is in fluid communication with first vent hole 88 via a space 92 that is defined by the wall portion 90.

In certain embodiments, the diameter of the cavity 84 gradually increases in length toward an outer end 94 of the stopper portion 74, as shown in FIG. 1. The cavity 84 may be of a frusto-conical shape. In according with this embodiment, the diameter of the cavity 84 gradually increases in length to the outer end 94 of the stopper portion 74. Further, it should be appreciated that the cavity 84 may be of another conic shape.

The outer portion 76 of the stopper portion 74 may be of a generally cylindrical shape and has an outer diameter 96 which along its length is substantially constant. According to an embodiment of the disclosure, the outer portion 76 gradually decreases in thickness toward the outer end thereof. Additionally, the outer portion 76 of the stopper portion 74 extends into the space 92 defined by the wall portion 90 of the outer race 22 and is positioned adjacent the wall portion 90.

A ramped transition 108 connects the first end portion 66 of the drive sleeve 30 with the outer portion 76 of the stopper portion 74. According to an embodiment of the disclosure, the stopper portion 74 is formed in a unitary manner with the drive sleeve 30.

As previously discussed, the wall portion 90 defines the space 92. The space 92 is in fluid communication with the interior 82 of the constant velocity joint assembly 20 and an area 126 that is partially defined by an inner diameter 128 of a shaft 130 via the first vent hole 88.

As illustrated in FIGS. 2 and 3, when the constant velocity joint assembly 20 is at a maximum articulation angle β, the outer portion 76 of the stopper portion 74 abuts the wall portion 90 of the outer race 22. When the outer portion 76 abuts the wall portion 90, the constant velocity joint assembly 20 is limited to the maximum articulation angle β. At the maximum articulation angle β, the outer portion 76 abuts the inboard extending portion 142 and the end 144 thereof. Limiting the constant velocity joint assembly 20 to the maximum articulation angle β prevents damage to the boot assembly 34 which may occur when the constant velocity joint assembly 20, exceeds the maximum articulation angle β.

Referring back to FIG. 1, the middle portion 68 is a substantially disk shaped portion of the drive sleeve 30 that is located between the first end portion 66 and the second end portion 70. The middle portion 68 of the drive sleeve 30 has an outer diameter that is greater than an outer diameter of the first end portion 66 of the drive sleeve 30. The middle portion 68 of the drive sleeve 30 defines a sleeve seat 146 of the drive sleeve 30. As illustrated in FIGS. 1-3, the sleeve seat 146 is angled and connected to a radial portion 150 that extends substantially vertically. When the first end portion 66 is drivingly engaged with the inner race 24, the sleeve seat 146 is disposed against a portion of the inner race 24 with a complementary shape.

Opposite the first end portion 66 of the drive sleeve 30 is the second end portion 70 of the drive sleeve 30. The second end portion 70 of the drive sleeve 30 is hollow and comprises a first inner diameter portion 152 and a second inner diameter portion 154 that are connected by a ramped transition 156. As illustrated in FIGS. 1-3, the first inner diameter portion 152 has a smaller diameter than the second inner diameter portion 154.

Additionally, the second end portion 70 of the drive sleeve 30 further comprises a plurality of inner splines 158 on the first inner diameter portion 152, a boot groove 160, a first O-ring groove 162 and a first snap ring groove 164. A first O-ring 166 is located within the first O-ring groove 162 and a first snap ring 168 is located within the first snap ring groove 164. The grooves 162 and 164 and rings 166 and 168 are located on an outer surface 170 of the second end portion 70 of the drive sleeve 30. As illustrated in FIGS. 1-3, the second end portion 70 is sealingly engaged with at least a portion of the boot assembly 34.

The plurality of inner splines 158 are formed on the first inner diameter portion 152 of the second end portion 70 for drivingly engaging the plug-in pinion shaft 36. Alternatively, the second end portion 70 may be coupled to the plug-in pinion shaft 36 in any manner that permits sliding engagement.

The first snap ring 168 engages a snap ring groove 172 on a first inside surface 174 of the drive nut 32. The first snap ring 168 axially secures the drive nut 32 to the drive sleeve 30. Alternatively, it is understood that the second end portion 70 may be configured to be engaged with the drive nut 32 in any conventional manner. Additionally, the O-ring 166 tightly seals the interface between the drive nut 32 and the drive sleeve 30.

On the outer surface 170 of the second end portion 70 of the drive sleeve 30 is the boot groove 160 that is an annular recess circumferentially extending along at least a portion of the outer surface 170 of the second end portion 70 of the drive sleeve 30. The boot groove 160 is formed intermediate the grooves 162 and 164 and the middle portion 68. As illustrated in FIGS. 1-3, the boot groove 160 receives at least a portion of, and is sealingly engaged with, the boot assembly 34. Alternatively, it is understood that the second end portion 70 may be configured with another feature which receives and sealingly engages the boot assembly 34 with the drive sleeve 30.

The drive nut 32 is a hollow annular member comprising a first portion 176 and a second portion 178. In a non-limiting example, the drive but 32 is formed from a rigid material such as iron, steel, aluminium or an alloy thereof. It is understood that the drive nut 32 may be formed using any conventional process from any rigid material. According to an embodiment of the disclosure, the portions 176 and 178 of the drive nut 32 are unitary and integrally formed. At least a portion of the first portion 176 of the drive nut 32 radially overlaps at least a portion of second end portion 70 of the drive sleeve 30. The first portion 176 has a larger inner diameter portion 180 than an inner diameter portion 182 of the second portion 178. Additionally, the first portion 176 of the drive nut 32 has the snap ring groove 172.

A first chamfered surface 184 on the first portion 176 of the drive nut 32 is located proximate the snap ring groove 172 to facilitate compression of the snap ring 168 during assembly.

The inner diameter 182 of the second portion 178 has a plurality of threads 186 thereon. The drive nut threads 186 engage with a complementary set of threads on the shaft 36. Additionally, the inner diameter 182 also defines a second snap ring groove 195 that is complementary to a snap ring groove 196 located on the shaft 36. A snap ring 194 is located within grooves 195 and 196 to axially secure the nut 32 and shaft 36 together. The shaft 36 also has an O-ring groove 190 within which an O-ring 192 is located. It is understood that the O-ring 190 seals the interface between the shaft 36 and the nut 32.

As illustrated in FIGS. 1-3, the boot assembly 34 includes a boot retainer 198 and boot 200. At least a portion of the boot assembly 34 is disposed on the outer race 22 and is in sealing engagement with the drive sleeve 30. A crimped portion of the boot retainer 198 couples the boot 200 to the boot retainer 198. The boot 200 is sealingly engaged with the drive sleeve 30 using a boot band assembly 202. According to an embodiment of the disclosure, the boot band assembly 202 is a clamping device. It should be understood that other types of clamping devices may be used with the constant velocity joint assembly 20 to sealingly engage the boot 200 with the drive sleeve 30.

The boot retainer 198 is an annular member formed from a rigid material, such as but not limited to a metal, a plastic, rubber or an elastomeric material. As illustrated in FIGS. 1-3, the boot retainer 198 is coupled to and is sealingly engaged with the outer race 22 of the constant velocity joint 20. A first end portion 204 of the boot retainer 198 engages a shoulder 206 defined by an outer surface 208 of the outer race 22. However, it should be appreciated that the boot retainer 198 may be coupled to the outer race 22 in other manners. A sealing member (not shown) such as, for example, an O-ring may be positioned between the boot retainer 198 and the shoulder 206 in a-groove (not shown) formed in the outer surface 208 of the outer race 22 to provide a seal between the boot retainer 198 and the outer race 22.

A second end portion 214 of the boot retainer 198 has a substantially U-shaped cross-section which encloses a portion of the boot 200 thereby coupling the boot 200 to the boot retainer 198. Alternately, the second end portion 214 may have other shapes that facilitate coupling the boot 200 to the boot retainer 198.

The boot 200 is an annular member having a substantially U-shaped cross-section formed from a resilient material, such as an elastomer. The boot 200 facilitates movement between the outer race 22 and the drive sleeve 30 while maintaining a sealing engagement therebetween. A first end portion 216 of the boot 200 is coupled to the boot retainer 198 as described hereinabove. A second end portion 218 of the boot 200 is sealingly engaged with and coupled to the boot groove 160 of the drive sleeve 30 as described hereinabove.

Drivingly engaged with the drive sleeve 30 when the constant velocity joint 20 is assembled is the plug-in pinion shaft 36 having a first end portion 220, a middle portion 222, and a second end portion 224. The plug-in pinion shaft 36 is an elongated member that is formed from a rigid material, such as but not limited to iron, steel, aluminium or an alloy thereof using any conventional process.

The first end portion 220 of the plug-in pinion shaft 36 is substantially cylindrical in shape and formed opposite the second end portion 224. As illustrated in FIGS. 1-3, the first end portion 220 of the plug-in pinion shaft 36 comprises a plurality of outer splines 226 that are corresponding to the inner splines 158 of the drive sleeve 30. When the constant velocity joint assembly 20 is assembled, the plug-in pinion shaft 36 is drivingly engaged with the drive sleeve 30 through the splines 158 and 226 so that the two rotate together as one. The plurality of outer splines 226 are formed on an outer surface 228 of the plug-in pinion shaft 36. According to an alternative embodiment of the disclosure, it is understood that the plug-in pinion shaft 36 may be drivingly engaged with the plug-in pinion shaft 36 in any manner that permits sliding engagement.

The middle portion 222 is a substantially cylindrically shaped portion of the plug-in pinion shaft 36 formed between the first end portion 220 and the second end portion 224. As illustrated in FIGS. 1-3, the middle portion 222 has a larger diameter than the first end portion 220 of the plug-in pinion shaft 36. Additionally, the two portions 220 and 222 are separated by a ramped transition portion 220. The snap ring and O-ring grooves 196 and 190 previously discussed are located in middle portion 222 of the plug-in pinion shaft 36. In order to secure the plug-in pinion shaft 36 to the drive nut 32 so that the two rotate together, the middle portion 222 of the plug-in pinion shaft 36 also comprises a set of threads 232 for engaging the threads 186 on the drive nut 32.

Drivingly engaged with a drive component (not shown) is the second end portion 224 of the plug-in pinion shaft 36. According to an embodiment of the disclosure, the second end portion 224 may have a beveled pinion gear that engages the drive component (not shown). However, it should be appreciated that the second end portion 224 of the plug-in pinion shaft 36 may be configured in any manner that permits driving engagement between the plug-in pinion shaft 36 and the drive component (not shown).

Grease or any other suitable lubricant is disposed within the interior 82 of the constant velocity joint assembly 20 to lubricate the torque transfer elements 28 and thus improve their slidability and increase the useful life of the constant velocity joint assembly 20. When the constant velocity joint 20 is spinning at high speeds, pressure is created in the interior 82. This pressure is then vented from the interior 82 of the constant velocity joint 20 via the first vent hole 88.

The first vent hole 88 is provided through at least a portion of the outer race 22 of the constant velocity joint 20. According to an embodiment of the disclosure, the first vent hole 88 is provided through and located in the wall portion 90 of the outer race 22 along the longitudinal axis 38 of the assembly 20. The first vent hole 88 provides fluid communication between the space 92 that is defined by the wall portion 90 of the outer race 22 and the area 126 that is partially defined by the inner diameter 128 of the shaft 130. FIGS. 1-3 of the disclosure depicts a single first vent hole 88 aligned with the longitudinal axis 38 of the assembly 20. According to yet another embodiment of the disclosure (not shown), the outer race 22 of the constant velocity joint assembly 20 includes additional vent holes in the wall portion 90.

When the constant velocity joint assembly 20 is spinning, the outer portion 76 of the stopper portion 74 moves within the space 92. Movement of the stopper portion 74 within the space 92 helps to vent the interior 82 of the constant velocity joint assembly 20 by creating air circulation in the space 92 and through the first vent hole 88. Air circulation through the first vent hole 88 also enhances the venting of the interior 82 of the constant velocity joint assembly 20 by helping to prevent blockages in and around the first vent hole 88 from forming.

Drivingly engaged with the shaft 130 is the attachment end 40 of the outer race 22. As a non-limiting example, the engagement of the shaft 130 to the attachment end 40 of the outer race 22 is typically done via welding, but other attachment methods may also be used.

The shaft 130 comprises the area 126 which is defined by the outer race 22, inner diameter 128 of the shaft 130 and a plug 234. In accordance with an embodiment of the disclosure, the inner diameter 128 of the shaft 130 is of a length which is substantially constant. It is within the scope of this disclosure that the plug 234 may solid without any gaps or breaks. As illustrated in FIGS. 1-3, the plug 234 is located in a space 236 and extends continuously across to seal against the inner diameter 128 in an airtight manner and define the area 126.

In fluid communication with the area 126 is a second vent hole 238 that is also in fluid communication with the atmosphere. The pressure created in the interior 82 of the constant velocity joint 20 is vented to the atmosphere via the second vent hole 238. Thus, fluid communication is provided between the interior 82 of the joint assembly 20, space 92, first vent hole 88, area 126, second vent hole 238 and atmosphere to vent pressure thereto.

The second vent hole 238 is provided in the attachment end 40 of the outer race 22. While one second vent hole 238 is depicted in the FIG. 1, additional vent holes may be used. The additional vent holes may be circumferentially spaced about the attachment end 40 or any spacing may be arranged between them. According to an embodiment of the disclosure, the second vent hole 238 may be fitted with a check valve (not shown) or other covering (not shown) in order to prevent dirt, debris or moisture from entering the joint 20 and/or clogging the vent holes 88, 238.

As previously discussed, the lubricant is provided in the joint to lubricate and cool the parts of the constant velocity joint 20. FIG. 2 depicts an exemplary lubricant fill level 240 for the constant velocity joint 20 when the constant velocity joint 20 is in a static condition. When the constant velocity joint 20 is in a static condition, the constant velocity joint 20 is not rotating or not rotating much. It can be appreciated that the lubricant fill level 240 can vary within different joints for different applications.

FIG. 3 of the present disclosure depicts the constant velocity joint 20 of FIG. 2 in a dynamic condition. In other words, FIG. 3 illustrates the lubricant fill level 241 in the constant velocity joint 20 when the constant velocity joint 20 is rotating. As the constant velocity joint 20 rotates, the centrifugal force F pushes the lubricant into the radially outer portions of the constant velocity joint 20.

Figure 5A:
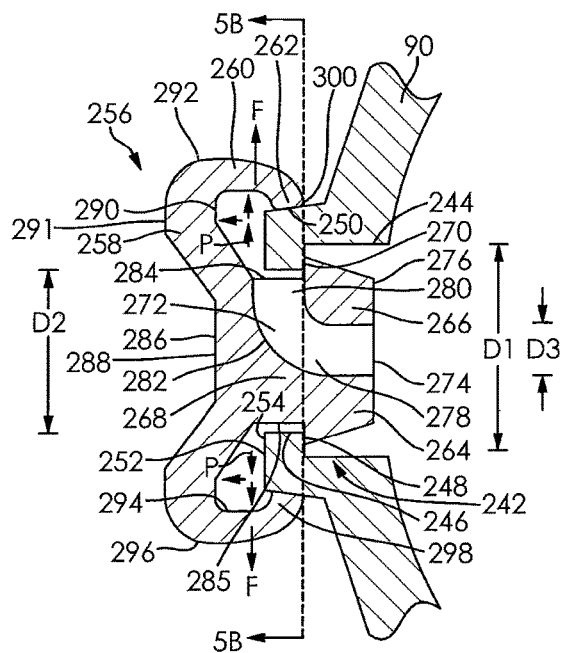
FIG. 5A is a partial schematic cross-sectional side-view of the constant velocity joint illustrated in FIGS. 1, 2, 3 and 4 where the constant velocity joint assembly has the outer race with the vent hole and a valve according to the embodiment of the disclosure illustrated in FIG. 4.
Figure 5B:
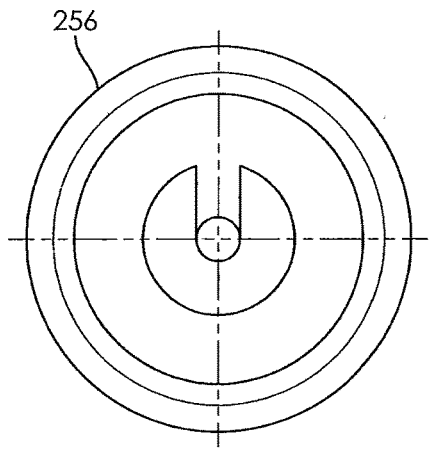
FIG. 5B is a schematic bottom-view of the valve according to the embodiment of the disclosure illustrated in FIGS. 4 and 5A.

FIGS. 4, 5A and 5B illustrates another embodiment of the first vent hole 242. The first vent hole 242 may be comprised of a first axially extending channel 244 having a first diameter D1 and a second axially extending channel 246 having a diameter D2. The second axially extending channel 246 is directly axially adjacent the first axially extending channel 244 and is integrally connected to the first axially extending channel 244 by a radially extending wall 248. As illustrated in FIGS. 4 and 5A, the diameter D2 of the second axially extending channel 246 is smaller than the diameter D1 of the first axially extending channel 244. Both the first axially extending channel 244 and the second axially extending channel 246 may be integrally formed as a single unitary piece with the wall portion 90 of the outer race 22 of the constant velocity joint 20.

According to an embodiment of the disclosure, the axial length of the first axially extending channel 244 may be greater than the thickness of the wall portion 90 of the outer race 22. In accordance with this embodiment of the disclosure, a first portion 250 of an outer surface 252 of the wall portion 90 may extend in the axial direction. A second portion 254 of the outer surface 252 of the wall portion 90 may extend from the first portion 250 in the radially inward-direction. The second portion 254 contacts the second axially extending channel 246.

A valve 256 is at least partially located within the first vent hole 242. In accordance with an embodiment of the disclosure, the valve 256 is located within the second axially extending channel 246 and at least a portion of the first axially extending channel 244.

The valve 256 comprises four portions: a disk portion 258, a breather portion 260, a lip portion 262 and a stopper portion 264. According to an embodiment of the disclosure, the four portions of the valve 256 are integrally formed as a single unitary piece of material. In a non-limiting example, the valve 256 may be made of a plastic, rubber or an elastomeric material.

As illustrated in FIGS. 5 and 5A, the stopper portion 264 of the valve 256 comprises of two portions: a first axial inner portion 266 and a second axial outer portion 268. The first axial inner portion 266 is at least partially located within the first axially extending channel 244 so that the channel 244 is concentric with the first axial inner portion 266 of the valve 256. The second axial outer portion 268 of the valve 256 is at least partially located within the second axially extending channel 246 so that the channel 246 is concentric with the second axial outer portion 268. According to an embodiment of the disclosure, the second axial outer portion 268 has a smaller diameter than the second axially extending channel 246. It is within the scope of this disclosure that there may or may not be a gap that exists between the channel 246 and the second axial outer portion 268 of the valve 256.

A radially outward extending portion 270 is located between the first axial inner portion 266 and the second axial outer portion 268 of the valve 256. The radially outward extending portion 270 is in direct axial contact with at least a-portion of the radially extending wall 248 of the first vent hole 242. This design prevents the valve 256 from being pushed into or pulled out of the outer race 22.

The first axial inner portion 266 may have a frusto-conical outer surface that tapers from the outward to the inward direction. Other shapes are permissible as well, including but not limited to cylindrical.

A channel 272 is located through the valve 256. The channel 272 has a first aperture 274 in an end surface 276 of the first axial inner portion 266. The channel 272 extends through at least a portion of the body of the valve 256. As illustrated in FIGS. 4, 5A and 5B, a first portion 278 of the channel 272 extends axially in the stopper portion 264 of the valve 256, while a second portion 280 of the channel 272 that is in fluid communication with the first portion 278, extends in a radial direction. A curvilinear elbow 282 may be used to connect the two portions 278 and 280 thereby fluidly connecting the first portion 278 with the second portion 280 of the channel 272. As illustrated in FIGS. 5 and 5A, the second portion 280 of the channel 272 ends at a second aperture 284 in an outer surface 285 of the second outer axial portion 268 of the stopper portion 264. The second aperture 284 may be radially inward from a portion of the second axially extending channel 246. Additionally, the second aperture 284 may be radially inward from the second portion 254 of the outer surface 252 of the wall portion 90 that extends in the radially inward direction. The channel 272 has a diameter D3 where D3<D2<D1. According to an embodiment of the disclosure, there is only a single channel 272 in the valve 256. In accordance with an embodiment of the disclosure (not shown), the valve 256 may include a plurality of channels.

Located axially adjacent to and extending radially outward from the stopper portion 264 of the valve 256 is the disk portion 258 having an inner surface 290 and an outer surface 291. According to an embodiment of the disclosure, the disk portion 258 may have an axially inward depression 286 on an outer surface 288.

The breather portion 260 of the valve 256 comprises an axially extending ring 292 having an inner surface 294 and an outer surface 296. According to an embodiment of the disclosure, the thickness between the two surfaces 294 and 296 may be the same or it may vary. In accordance with the embodiment of the disclosure where the thickness between the two surfaces is the same, the surfaces 294 and 296 are parallel one another and are parallel to the axis 38 of the constant velocity joint assembly 20.

A ring 298 extends radially inward from the breather portion 260 of the lip portion 262 of the valve 256. The ring 298 of the lip portion 262 of the valve 256 has an end surface 300 that directly contacts at least a portion of the outer surface 250 of the wall portion 90. According to an embodiment of the disclosure, at least a portion of the end surface 300 is in direct contact with at least a portion of the outer surface 250 of the wall portion 90 extending in the axial direction. As illustrated in FIGS. 4 and 5A, the wall portion 90 may extend at a first angle from horizontal.

In accordance with an embodiment of the disclosure, the lip portion 262 is typically biased into direct contact with at least a portion of the outer surface 250 of the wall portion 90 of the outer race 22. However, depending on the centrifugal force F and the air pressure P inside the joint 20, the lip portion 262 may be selectively moved in the radially outward direction to release air pressure developed within the constant velocity joint 20.

Figure 6:
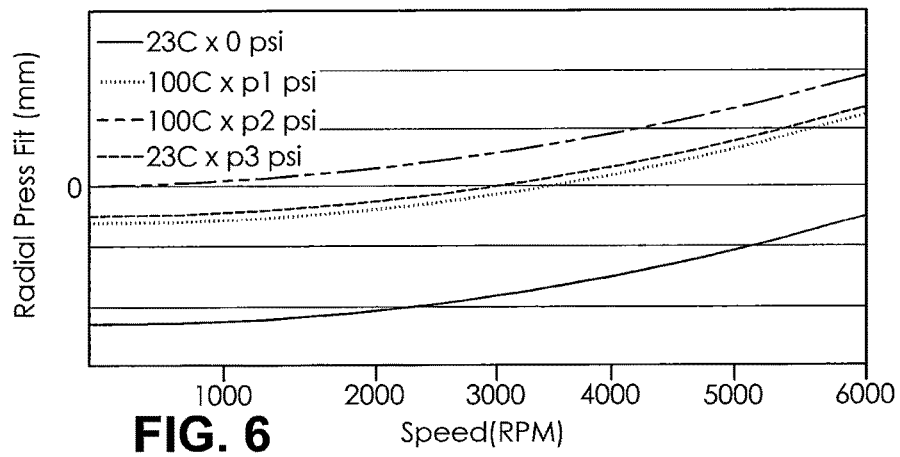
FIG. 6 is a graphical illustration of a simulated valve performance for the valve illustrated in FIGS. 4, 5A and 5B based a rotational speed of the constant velocity joint assembly, a pressure and a radial press fit of the lip portion of the valve.

FIG. 6 shows an example of a simulated valve performance by speed, pressure and radial press fit at the lip portion 298. For ambient temperature conditions in the joint 20, such as 23 degrees C., the lip portion 298 is closed at 0 psi but it can be opened at approximately 3000 rpm and at pressure P3. When the temperature is approximately 100 degrees C. in the joint 20, and at a pressure P1, the lip portion 298 is closed in the range from zero rpm to approximately 3300 rpm, and open at all times above 3300 rpm. When the temperature is approximately 100 degrees C. in the joint 20, and at a pressure P2, the lip portion 298 opens up at approximately zero rpm.

Based on the foregoing, it can be appreciated that lubricant can be prevented from moving through the valve channel 272 since the valve 256 is always effectively closed in a static condition of the joint 20. It can also be appreciated that since the pressure from within the joint 20 is appropriately relieved, the boot 200 will remain in its intended geometry and shape, which maximizes is durability and life. Further, lay using centrifugal force F to help open the valve 256 during dynamic conditions, the valve 256 can be opened up at relatively low pressure, which benefits the boot 200 as mentioned above.

Figure 7:
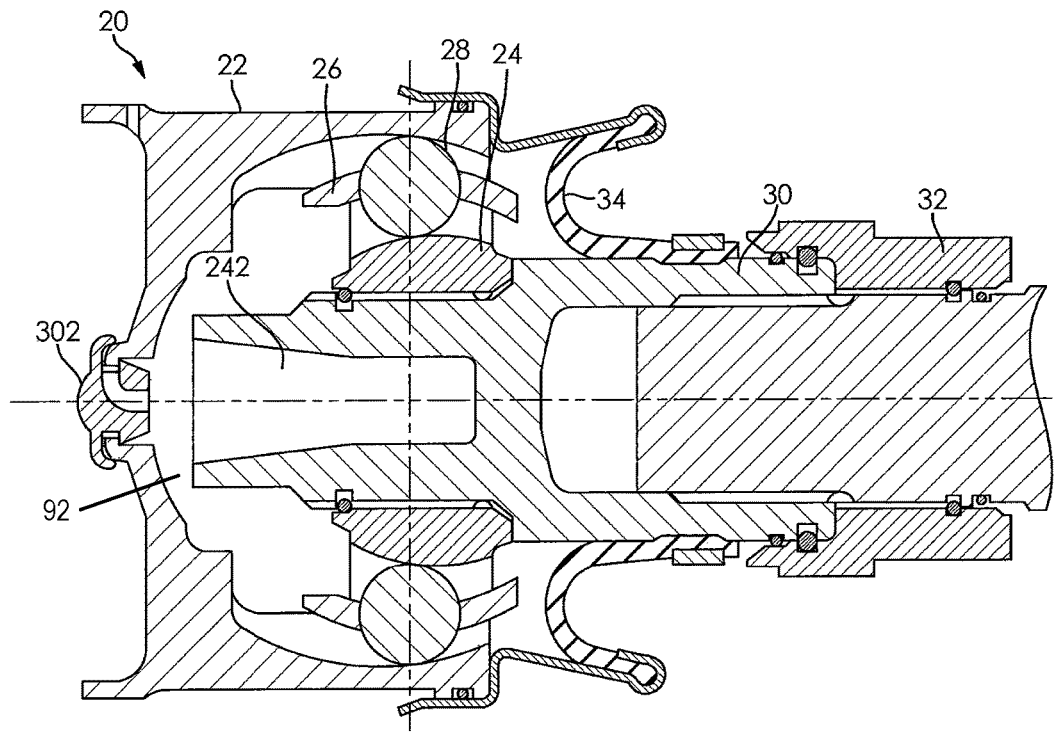
FIG. 7 is a schematic cross-sectional side-view of the constant velocity joint illustrated in FIGS. 1-5A where the constant velocity joint assembly has a valve according to another embodiment of the disclosure.

FIGS. 7, 8A and 8B depicts another embodiment of a valve 302 for use with a constant velocity joint 20. The valve 302 and the constant velocity joint 20 are the same as described above and illustrated in FIGS. 1-5B, except where specifically noted below.

As illustrated in FIGS. 7,8A and 8B, the valve 302 terminates at the breather portion 260 and does not have a lip portion. The axially extending ring of the breather 260 terminates in a radially extending wall 304. At least a portion of an edge portion 306 of the radially extending wall 304 contacts at least a portion of an outer surface 308 of the wall portion 90. In the depicted, the outer surface 308 of the wall portion 90 extends a second angle, where the second angle is at a greater angle from horizontal than the first angle.

Figure 10:
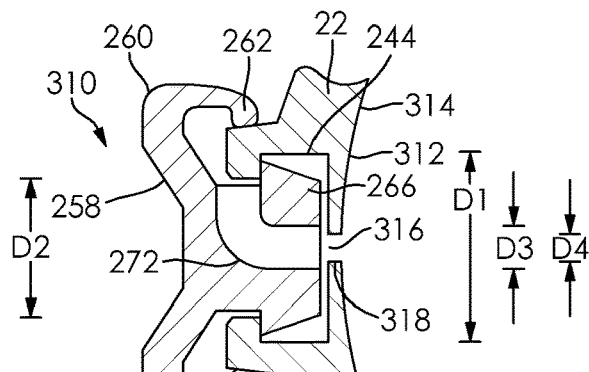
FIG. 10 is a partial schematic cross-sectional side-view of the constant velocity joint illustrated in FIGS. 1-5A, 7, 8A and 9 where the constant velocity joint assembly has the outer race and vent hole illustrated in FIG. 9 and the valve illustrated in FIGS. 4, 5A, 5B and 9.

FIGS. 9 and 10 depict another embodiment of a valve 310 for use with a constant velocity joint 20. The valve 310 and the joint 20 are the same as described above and depicted in FIGS. 1-5 and 7-8B, except where specifically noted below.

A radially inward directed rib 312 is provided on an inner surface 314 of the outer race 22. The rib 312 is located axially inward from the first axially extending channel 244. According to an embodiment of the disclosure, the rib 312 is located axially inward a sufficient amount so that there is a gap between the rib 312 and the stopper portion 264 of the valve 310.

The rib 312 is impermeable, except for an aperture 316 in its center. As illustrated in FIGS. 9 and 10, the aperture 316 is axially aligned with the channel 272 in the valve 310. The rib 312 may have an inner circumferential surface 318 with a diameter D4 that is smaller than the diameter D3 of the channel 272 of the valve 310. The smaller diameter D4 of the rib 312 is designed to reduce the flow of lubricant through the channel 272 by at least partially blocking the channel 272. In addition, the rib 312 can be used to reduce, or prevent, lubricant from flowing out of the joint 20 if the valve 310 were to fall out or otherwise fail.

Figure 11:
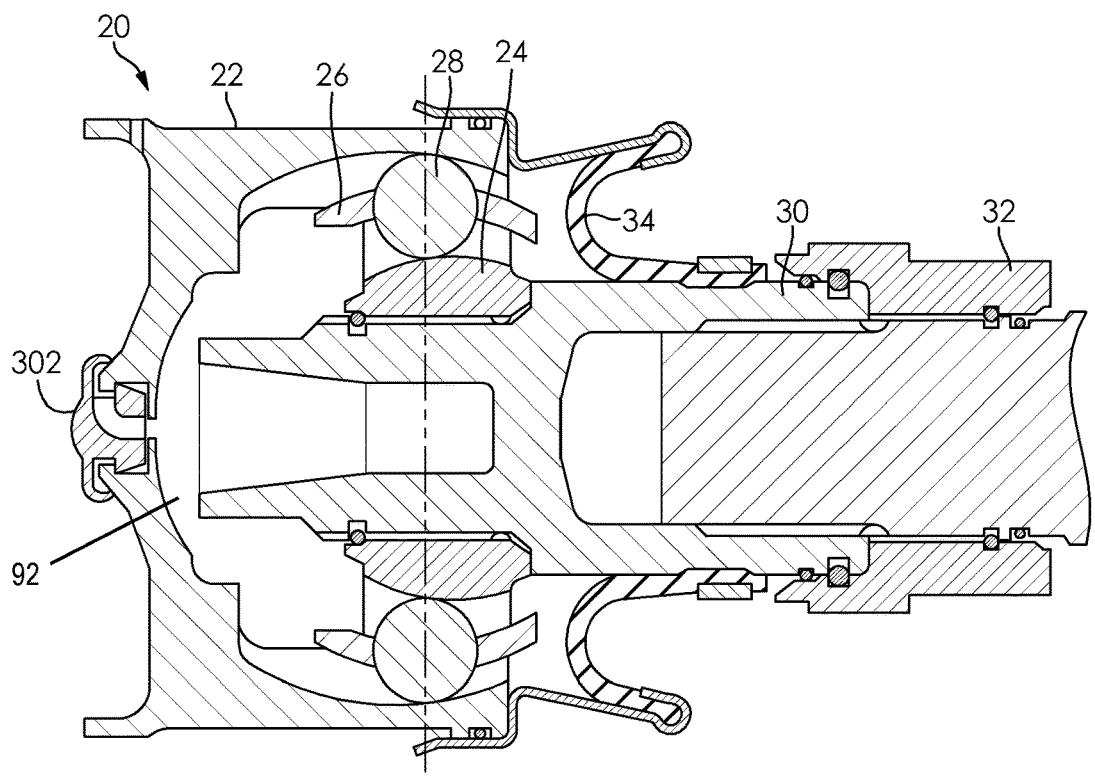
FIG. 11 is a schematic cross-sectional side-view of the constant velocity joint assembly illustrated in FIGS. 1-5A, 7, 8A, 9 and 10 where the constant velocity joint assembly has an outer race with a vent hole according to yet another embodiment of the disclosure and the valve illustrated in FIGS. 7, 8A and 8B.
Figure 12:
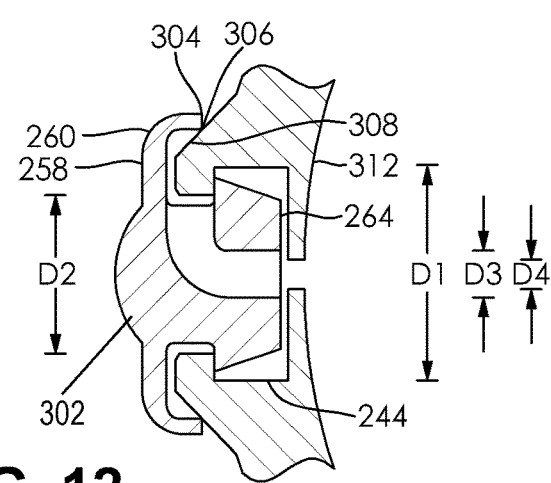
FIG. 12 is a partial schematic cross-sectional side-view of the constant velocity joint illustrated in FIGS. 1-5A, 7, 8A and 9-11 where the constant velocity joint assembly has the outer race and vent hole illustrated in FIG. 11 and the valve according illustrated in FIGS. 7, 8A, 8B and 11.

FIGS. 11 and 12 depict a yet another embodiment wherein the valve 302 of FIGS. 7, 8A and 8B as used with the rib 312 described above and depicted in FIGS. 9 and 10 of the disclosure.

FIGS. 13 and 14 depict still yet another embodiment wherein the valve 256 of FIGS. 4, 5A and 5B, and described above is utilized with an additional feature. As illustrated in FIGS. 13 and 14 of the disclosure, the additional feature is a radially inwardly directed protrusion 320 on the ring 298 of the lip portion 262 of the valve 256. In accordance with this embodiment of the disclosure, only the protrusion 320 directly contacts at least a portion of the outer surface 250 of the wall portion 90 of the outer race 22. As a result, a gap 322 exists between the ring 298 of the lip portion 262 and the outer surface 250 of the wall portion 90 of the outer race 22. The protrusion 320 permits pressure to escape more easily as compared with when the entire lip portion 262 is in direct contact with at least a portion of the outer race 22. Pressure escapes more easily by bypassing the protrusion 320 since it has less material to move as compared with the entire lip portion 262.

In addition, the wall portion 90 of the outer race 22 is provided with an additional feature. As illustrated in FIG. 13, the outer race 22 of the constant velocity joint 20 includes a radially inward directed step 324 on the inner surface 314 of the wall portion 90 of the outer race 22. According to an embodiment of the disclosure, the step 324 may axially encroach on the first axially extending channel 244. In this embodiment, the step 324 may be located directly adjacent the frusto-conical surface of the stopper portion 264. As illustrated in FIG. 13 of the disclosure, an inner edge portion 326 of the step 324 may be located directly adjacent the frusto-conical surface of the stopper portion 264. The step 324 may extend axially beyond the stopper portion 264 of the valve 256. In accordance with an embodiment of the disclosure, the step 324 has an inner circumferential diameter D5 that is smaller than the diameters D1 of the first axially extending channel 244. Additionally, the inner circumferential diameter D5 of the step 324 is larger than the diameter D2 of the second axially extending channel 246. In accordance with an alternative embodiment of the disclosure (not shown), the inner circumferential diameter of the step is smaller than the diameter of the second axially extending channel.

FIGS. 15 and 16 depict a further embodiment wherein the valve 256 of FIGS. 13 and 14 with the protrusion 320 is utilized. Additionally, as illustrated in FIG. 15, the rib 312 of FIGS. 9 and 10 is also utilized as well. The benefits and functions described above for the embodiments in FIGS. 9, 10, 13 and 14 are had in this embodiment of the disclosure as well. As illustrated in FIG. 15, the step 324 is located axially outward from the rib 312 such that the step 324 is located between the first axially extending channel 244 and the rib 312 on the wall portion 90 of the outer race 22. As previously discussed the smaller diameter D4 of the rib 312 is designed to reduce the flow of lubricant through the channel 272 by at least partially blocking the channel 272. Additionally, as illustrated in FIG. 15, the diameter D4 of the rib 312 has a diameter that is smaller than the diameters D3, D2 and D1 such that D4<D3<D2<D1.

The valve 256, 302 and 310 previously discussed and illustrated in FIGS. 4-5B and 7-16 is designed to seal the vent hole 242 and prevent the lubricant from escaping the constant velocity joint 20 when the joint 20 is in a static condition. Additionally, the valve 256, 302 and 310 is designed to vent air from within the constant velocity joint 20 when the pressure within the joint 20 reaches an undesirable level, whether the joint 20 is in a static or a dynamic condition.

In order for the valve 256, 302 and 310 to seal the vent hole 242 when the constant velocity joint 20 is in a static condition, an amount of sealing force needed to seal the lubricant within the joint 20 needs to be determined. Once the sealing force is determined, at least a portion of the breather portion 260 and/or the lip portion 262, of the valve 256, 302 and 310 applies the pre-determined amount of sealing force onto at least a portion of the outer surface 252 of the wall portion 90 of the outer race 22 of the joint 20.

As previously discussed, the valve 256, 302 and 310 is also designed to vent an amount of air from within the constant velocity joint 20 when the pressure within the joint 20 reaches an undesirable level. In order to vent an amount of air from within the constant velocity joint 20, an undesirable constant velocity joint static condition internal air pressure and an undesirable constant velocity joint dynamic condition internal air pressure needs to be determined.

As the air pressure P builds up within the constant velocity joint 20, the air within the constant-velocity joint 20 applies a radial and/or an axial force onto the disk portion 258, the breather portion 260 and/or the lip portion 262 of the valve 256, 302 and 310. When the constant velocity joint 20 is in a static condition, and the air pressure P within the joint 20 reaches the pre-determined undesirable constant velocity joint static condition air pressure, the valve 256, 302 and 310 opens venting an amount of air from within the joint 20 to the atmosphere. Once the internal air pressure P within the constant velocity joint 20 falls below the pre-determined undesirable constant velocity joint static condition air pressure, the biasing force of the valve 256, 302 and 310 closes and seals the valve 256, 302 and 310.

When the constant velocity joint 20 is in a dynamic condition, and the air pressure P builds up within the joint 20, the air within the joint 20 applies a radial and/or an axial force onto the disk portion 258, the breather portion 260 and/or the lip portion 262 of the valve 256, 302 and 310. Additionally, when the constant velocity joint 20 is in a dynamic condition, a centrifugal force F is applied onto the disk portion 258, the breather portion 260 and/or the lip portion 262 of the valve 256, 302 and 310. Once the internal air pressure P within the pre-determined undesirable constant velocity joint dynamic condition air pressure is reached, the valve 256, 302 and 310 opens venting an amount of air from within the joint 20 to the atmosphere. When the internal air pressure P within the constant velocity joint 20 falls below the pre-determined undesirable constant velocity joint dynamic condition air pressure, the biasing force of the valve 256, 302 and 310 closes and seals the valve 256, 302 and 310.

By utilizing the centrifugal force F exerted on the valve 256, 302 and 310 when the valve 256, 302 and 310 is in a dynamic condition, it allows the valve 256, 302 and 310 to open and vent the constant velocity joint 20 at a lower air-pressure P than when the joint 20 is in a static condition. This aids in increasing the life and durability of the boot assembly 34.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. An air vent system for a constant velocity joint, comprising:
   a constant velocity joint having an inner race, an outer race, a cage, and a plurality of torque transferring elements;
      wherein said outer race of said constant velocity joint has a wall portion with a vent hole having a first axially extending channel and a second axially extending channel;
   a valve is at least partially located within said vent hole in said wall portion of said outer race, wherein said valve comprises:
      a stopper portion comprising a first axial inner portion, a second axial outer portion, and a radially outward extending portion interposed between said first and second axial inner portions;
         wherein said first axial inner portion is at least partially located within said first axially extending channel in said wall portion of said outer race;

wherein said second axial outer portion is located within said second axially extending channel in said wall portion of said outer race;
a disk portion located axially adjacent to and extends outward from said second axial outer portion of said stopper portion of said valve;
a breather portion comprising a ring; and
a channel comprising a first aperture, a second aperture, a first portion, a second portion and a cantilever elbow fluidly connecting said first portion of said channel in said valve with said second portion of said channel in said valve.

2. The air vent system of claim 1, wherein said disk portion of said valve further comprises an axially inward depression on an outer surface of said disk portion of said valve.

3. The air vent system of claim 1,
wherein said channel has a diameter D3;
wherein said diameter D3 of said channel in said valve is smaller than said diameter D2 of said second axially extending channel of said wall portion of said outer race of said constant velocity joint;
wherein said diameter D3 of said channel in said valve is smaller than said diameter D1 of said first axially extending channel in said wall portion of said outer race of said constant velocity joint;
wherein said first aperture of said channel is located on an end surface of said first axial inner portion of said stopper portion of said valve;
wherein said first portion of said channel in said valve extends axially in said stopper portion of said valve from said first aperture;
wherein said second aperture of channel in said valve is located on an outer surface of said second axial outer portion of said stopper portion of said valve; and
wherein said second portion of said channel in said valve extends radially in said second axial outer portion of said valve from said second aperture.

4. The air vent system of claim 1, wherein said wall portion of said outer race further includes a rib, wherein said rib comprises an aperture;
wherein said rib extends radially inward from an inner surface of said wall portion of said outer race;
wherein said rib in said wall portion of said outer race is located axially inward from said first axially inward extending channel in said wall portion of said outer race;
wherein said aperture in said rib in said wall portion of said outer race has a diameter D4 that is smaller than a diameter D2 of said second axially extending channel in said wall portion and a diameter D1 of said first axially extending channel in said wall portion.

5. The air vent system of claim 4, wherein said aperture in said rib in said wall portion of said outer race has a diameter D4 that is smaller than a diameter D3 of said channel in said valve.

6. The air vent system of claim 1, wherein said wall portion of said outer race further comprises a step having a diameter D5;
wherein said step extends radially inward from an inner surface of said wall portion of said outer race;
wherein said step axially encroaches on said first axially extending channel in said wall portion of said outer race; and
wherein said step is located directly adjacent to said first axial inner portion of said stopper portion of said valve.

7. The air vent system of claim 6, wherein said diameter D5 of said step is smaller than said diameter D1 of said first axially extending channel of said wall portion of said outer race; and
wherein said diameter D5 of said step is larger than said diameter D2 of said second axially extending of said wall portion of said outer race.

8. The air vent system of claim 1, wherein said wall portion of said outer race further comprises a step and a rib, wherein said rib comprises an aperture;
wherein said rib extends radially inward from an inner surface of said wall portion of said outer race;
wherein said rib in said wall portion of said outer race is located axially inward from said first axially inward extending channel in said wall portion of said outer race;
wherein said aperture in said rib in said wall portion of said outer race has a diameter D4 that is smaller than a diameter D2 of said second axially extending channel in said wall portion and a diameter D1 of said first axially extending channel in said wall portion;
wherein said step having a diameter D5;
wherein said step extends radially inward from an inner surface of said wall portion of said outer race;
wherein said step axially encroaches on said first axially extending channel in said wall portion of said outer race;
wherein said step is located directly adjacent to said first axial inner portion of said stopper portion of said valve; and
wherein said step is axially outward from said rib on said inner surface of said wall portion of said outer race between said first axially extending channel and said rib.

9. The air vent system of claim 1, wherein said valve further comprises:
a lip portion comprising a ring;
wherein said ring of said lip portion of said valve extends radially inward from said breather portion of said valve; and
wherein an end surface of said ring of said lip portion of said valve is in direct contact with at least a portion of an outer surface of said wall portion of said outer race.

10. The air vent system on claim 9, wherein said lip portion of said valve further comprises a protrusion;
wherein said protrusion extends radially inward from said ring of said lip portion of said valve; and
wherein said protrusion extends from said ring of said lip portion of said valve is in direct contact with at least a portion of said outer surface of said wall portion of said outer race.

11. The air vent system of claim 1, wherein said first axially extending channel has a diameter D1 that is greater than a diameter D2 of said second axially extending channel.

12. The air vent system of claim 1, wherein said ring of said breather portion of said valve terminates in a radially extending wall; and
wherein at least a portion of an edge portion of said radially extending wall of said breather portion of said valve is in direct contact with at least a portion of an outer surface of said wall portion of said outer race.

13. The air vent system of claim 1, wherein an amount of centrifugal force and an amount of air-pressure is exerted onto said valve to selectively open said valve and reduce said air pressure within said constant velocity joint assembly.

14. The air vent system of claim 1, wherein at least a portion of said second aperture of said channel in said valve is disposed proximate to at least a portion of said second axially extending channel in said outer race of said constant velocity joint assembly.

15. The air vent system of claim 1, wherein ring of said breather portion of said valve extends axially away from at least a portion of said of said valve.

\* \* \* \* \*